US006661407B2

(12) United States Patent
Severson (10) Patent No.: US 6,661,407 B2
(45) Date of Patent: Dec. 9, 2003

(54) COMMUNICATION SYSTEM WITH INTERCHANGEABLE OVERLAYS

(76) Inventor: John R. Severson, 3625 Woodcroft Dr., Minnetonka, MN (US) 55345

( * ) Notice: Subject to any disclaimer, the term of this patent is extended or adjusted under 35 U.S.C. 154(b) by 100 days.

(21) Appl. No.: 09/812,333

(22) Filed: Mar. 19, 2001

(65) Prior Publication Data

US 2002/0158849 A1 Oct. 31, 2002

(51) Int. Cl.[7] .................................................. G09G 5/00
(52) U.S. Cl. ....................................... 345/173; 345/174
(58) Field of Search ................................ 434/112, 169; 235/441; 381/51; 379/51; 364/513.5; 341/23; 345/173, 174, 156

(56) References Cited

U.S. PATENT DOCUMENTS

| 4,465,465 A | 8/1984 | Nelson ........................ 434/112 |
| 4,785,420 A | 11/1988 | Little ........................ 364/513.5 |
| 4,890,259 A | 12/1989 | Simko ........................ 365/45 |
| 4,908,845 A | 3/1990 | Little ........................ 379/51 |
| 4,954,083 A | 9/1990 | Leff ........................ 434/112 |
| 5,161,199 A | 11/1992 | David ........................ 381/51 |
| 5,266,034 A | 11/1993 | Mitz ........................ 434/185 |
| 5,433,610 A | 7/1995 | Godfrey ........................ 434/169 |
| 5,450,078 A | 9/1995 | Silva ........................ 341/23 |
| 5,810,597 A | 9/1998 | Allen, Jr. ........................ 434/112 |
| 5,828,592 A | 10/1998 | Tran ........................ 365/45 |
| 5,883,372 A | 3/1999 | Kim ........................ 235/441 |

Primary Examiner—Vijay Shankar
Assistant Examiner—Nitin Patel
(74) Attorney, Agent, or Firm—Michael S. Neustel (57) ABSTRACT

A communication system with interchangeable overlays for recording and playing audio data corresponding to graphical and/or textual elements on an overlay wherein the audio data is stored upon the overlay. The communication system with interchangeable overlays includes a communication device having a touch pad integrated within, an overlay removably positionable within the communication unit, and a control unit attached to the overlay. An interface within the control unit allows communication with the communication unit when the overlay is positioned upon the touch pad. The control unit has two main types of recordable data contained within: "structure data" for identifying one or more elements upon the overlay, and "audio data" that corresponds to the elements of the overlay.

14 Claims, 11 Drawing Sheets

COMMUNICATION SYSTEM WITH INTERCHANGEABLE OVERLAYS

BACKGROUND OF THE INVENTION

1. Field of the Invention

The present invention relates generally to augmentive communication devices and more specifically it relates to a communication system with interchangeable overlays for recording and playing audio data corresponding to graphical and/or textual elements on an overlay wherein the audio data is stored upon the overlay.

2. Description of the Prior Art

Augmentative communication devices that allow individuals with a speaking disability to communicate have been in use for years. Augmentative communication devices are typically utilized to assist individuals with speaking disabilities to communicate to others. With most devices commercially available, audio or visual information is controlled by the user. There are two main types of communications devices on the market: visual output and audio output. Visual output devices include mechanical pointers, phrase books, picture symbol books, and CRT or LCD displays. Audio output included recorded speech, sound, or synthesized speech for indicating user choices, phrases and sentences to other people. There are also devices available that combine visual output and audio output that will not be discussed.

A commonly utilized communication system involves the usage of a communication device having a touch pad which utilizes various overlays. Each overlay includes a plurality of "items" such as pictures or text. When the user positions an overlay upon the communication device, the user must directly input to the communication device an identifier describing the overlay that is currently being utilized. When an individual presses upon an item or area of the overlay, the communication device accesses its memory to play the associated sound, word or sentence.

While these devices may be suitable for the particular purpose to which they address, they are not as suitable for providing an incrementally expandable and diverse storage capacity that can be utilized upon various communication devices. Conventional communication devices do not allow for the recording of structure data and audio data stored upon a removable overlay and require difficult programming for a user to utilize the devices.

In these respects, the communication system with interchangeable overlays according to the present invention substantially departs from the conventional concepts and designs of the prior art, and in so doing provides an apparatus primarily developed for the purpose of providing an incrementally expandable and diverse storage capacity that can be utilized upon various communication devices.

SUMMARY OF THE INVENTION

In view of the foregoing disadvantages inherent in the known types of augmentive communication devices now present in the prior art, the present invention provides a new communication system with interchangeable overlays construction wherein the same can be utilized for providing an incrementally expandable and diverse storage capacity that can be utilized upon various communication devices.

The general purpose of the present invention, which will be described subsequently in greater detail, is to provide a new communication system with interchangeable overlays that has many of the advantages of the augmentive communication devices mentioned heretofore and many novel features that result in a new communication system with interchangeable overlays which is not anticipated, rendered obvious, suggested, or even implied by any of the prior art augmentive communication devices, either alone or in any combination thereof.

To attain this, the present invention generally comprises a communication device having a touch pad integrated within, an overlay removably positionable within the communication unit, and a control unit attached to the overlay. An interface within the control unit allows communication with the communication unit when the overlay is positioned upon the touch pad. The control unit has two main types of recordable data contained within: "structure data" for identifying one or more elements upon the overlay, and "audio data" that corresponds to the elements of the overlay.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a communication system with interchangeable overlays that will overcome the shortcomings of the prior art devices.

A second object is to provide a communication system with interchangeable overlays for providing an incrementally expandable and diverse storage capacity that can be utilized upon various communication devices.

Another object is to provide a communication system with interchangeable overlays that eliminates the need to coordinate stored structure and audio data with an overlay when changing overlays within a communication device.

An additional object is to provide a communication system with interchangeable overlays that can be utilized as a communication tool, learning aid, or an entertainment device.

A further object is to provide a communication system with interchangeable overlays that allow for a wide variety of elements comprised of graphics and/or textual.

Another object is to provide a communication system with interchangeable overlays that allows for an overlay to be reutilized with different elements and structures without requiring the purchase of separate overlay.

A further object is to provide a communication system with interchangeable overlays that is programmable.

Another object is to provide a communication system that does not require a user to program or set the communication unit according to the overlay to be utilized.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Turning now descriptively to the drawings, in which similar reference characters denote similar elements throughout the several views, FIGS. 1 through 11 illustrate a communication system with interchangeable overlays 10, which comprises a communication device having a touch pad 21 integrated within, one or more overlays 30 removably positionable within the communication unit 20, and a control unit 40 attached to the overlay 30. An interface 42 within the control unit 40 allows communication with the communication unit 20 when the overlay 30 is positioned upon the touch pad 21. The control unit 40 has two main types of recordable data contained within: "structure data" for identifying one or more elements 32 upon the overlay 30, and "audio data" that corresponds to the elements 32 of the overlay 30.

The communication unit 20 preferably includes a housing structure that may have various shapes, sizes and structures as can be appreciated by one skilled in the art. The communication unit 20 preferably is comprised of a portable structure, however non-portable structures may also be utilized to construct the communication unit 20. The communication unit 20 is the central unit for receiving, reading and programming each of the overlays 30 as desired by a user. The communication unit 20 preferably includes a keypad 24, a display 22, touch pad 21, microphone 60 and speaker 70 contained within.

The communication unit 20 preferably includes a microprocessor, a memory bus, random access memory (RAM), read only memory (ROM), a peripheral bus, and a keypad 24 controller as is commonly found upon conventional computers today. The microprocessor is a general purpose digital processor which controls the operation of the communication unit 20. Microprocessor can be a single-chip processor or implemented with multiple components. Using instructions retrieved from memory within the control unit 40, microprocessor controls the reception and manipulations of input data and the output and display 22 and play of data on output devices.

The memory bus is used by microprocessor to access RAM and ROM. RAM is used by microprocessor as a general storage area and as scratch-pad memory, and can also be used to store input data and processed data. ROM can be used to store instructions or program code followed by microprocessor as well as other data.

Peripheral bus is used to access the input, output and storage devices used by the communication unit 20. In the described embodiment(s), these devices include a computer monitor, a printer device, a floppy disk drive, a hard disk drive, and a network interface. A keyboard controller is used to receive input from a standard keyboard and send decoded symbols for each pressed key to microprocessor over the bus.

The display 22 is an output device that displays 22 images of data provided by the microprocessor via the peripheral bus or provided by other components in the computer system. The printer device when operating as a printer provides an image on a sheet 34 of paper or a similar surface. Other output devices such as a plotter, typesetter, etc. can be utilized in place of, or in addition to, the printer device.

The floppy disk drive and the hard disk drive can be utilized to store various types of data. The floppy disk drive facilitates transporting such data to other computer systems, and the hard disk drive permits fast access to large amounts of stored data. The microprocessor together with an operating system operate to execute computer code and produce and use data. The computer code and data may reside on RAM, ROM, hard disk drive and the control unit 40.

The network interface circuit is utilized to send and receive data over a network connected to other computer systems. An interface card or similar device and appropriate software implemented by microprocessor can be utilized to connect the communication unit 20 to an existing network and transfer data according to standard protocols.

Figure 1:
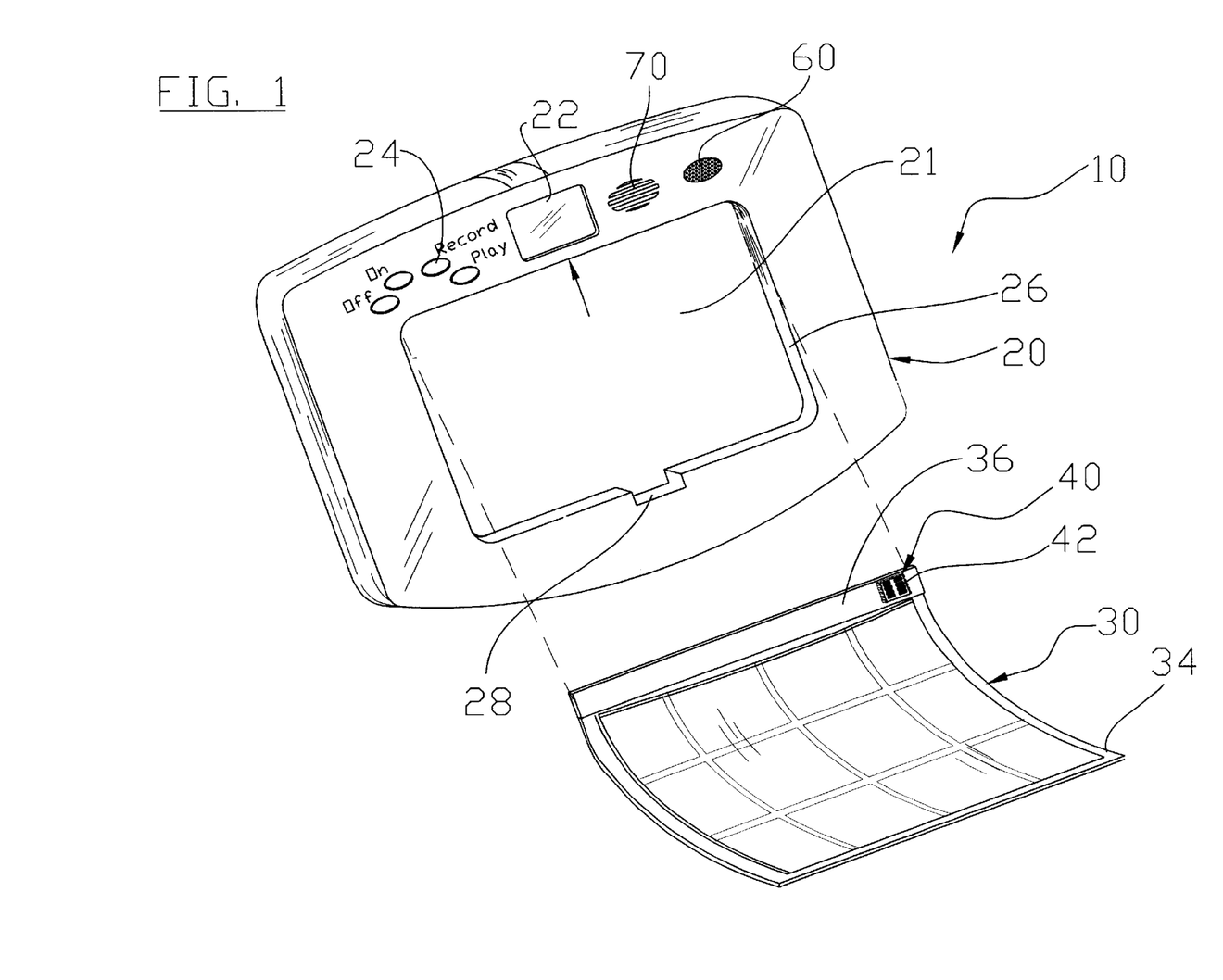
FIG. 1 is an exploded upper perspective view of the present invention.

The communication unit 20 includes a cavity 26 within for removably receiving an overlay 30 as best illustrated in FIG. 1 of the drawings. An upper groove and a lower groove within the cavity 26 receive the upper and lower portions of the overlay 30. A cutout 28 within the communication unit 20 allows for an individual to retrieve an overlay 30 positioned within the communication unit 20.

The touch pad 21 is positioned within the cavity 26 for reading the position of an item touching the touch pad 21 with the overlay 30 positioned over the touch pad 21. The touch pad 21 preferably operates upon the detection of increased pressure points upon the touch pad 21, however various other touch pad 21 technologies may also be utilized within the present invention that operate with an overlay 30 positioned over the touch pad 21.

As shown in FIGS. 1 through 5 of the drawings, a microphone 60 and a speaker 70 are preferably positioned within the communication unit 20 though it can be appreciated these devices may be positioned externally. The microphone 60 allows for a user to record audio data upon memory within the control unit 40 and may be comprised of any standard microphone 60 structure. The speaker 70 emits audio from audio data contained upon the control unit 40 that corresponds to an element 32 of the overlay 30 selected by a user. The speaker 70 may be comprised of any standard speaker 70 structure.

Figure 6:
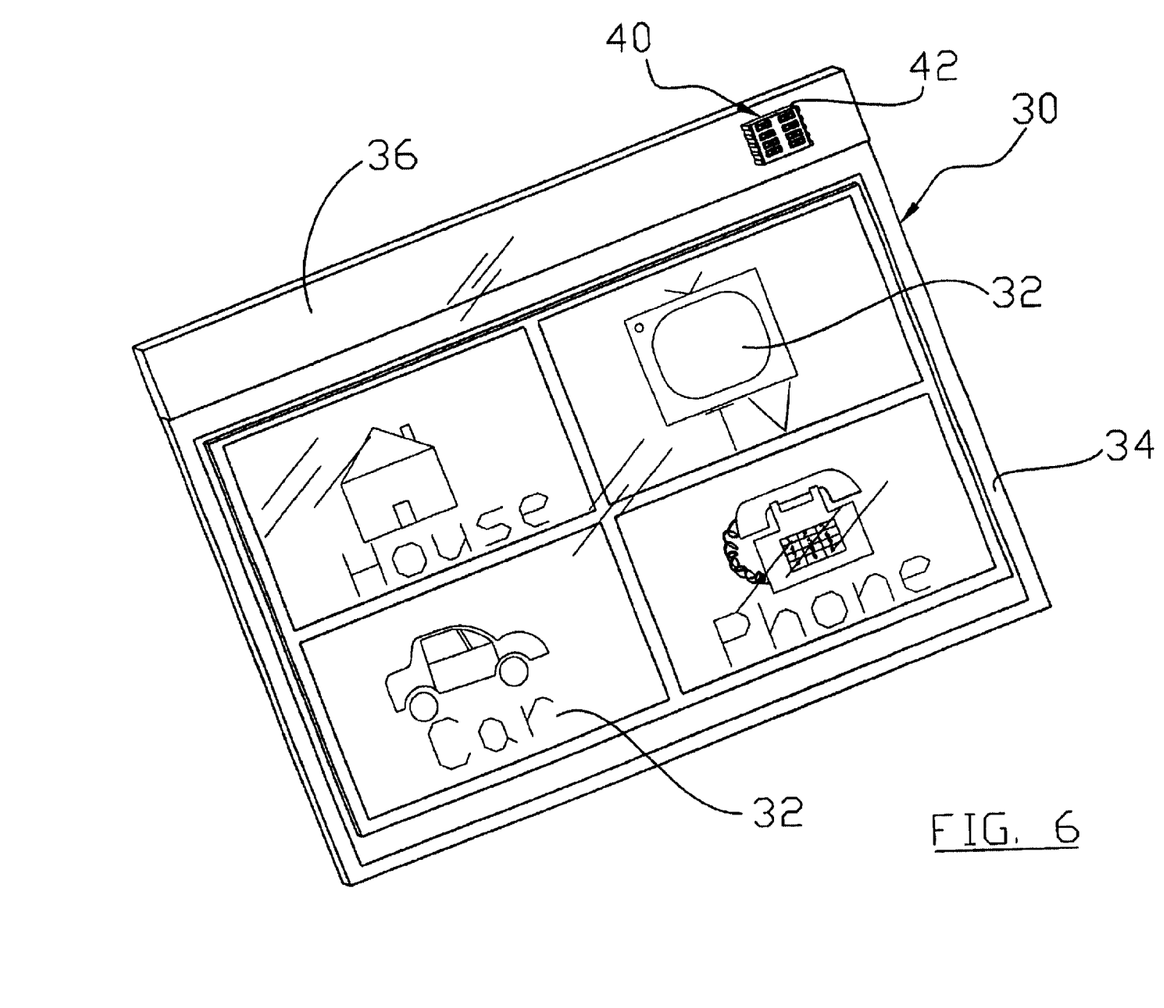
FIG. 6 is an upper perspective view of an overlay.
Figure 7:
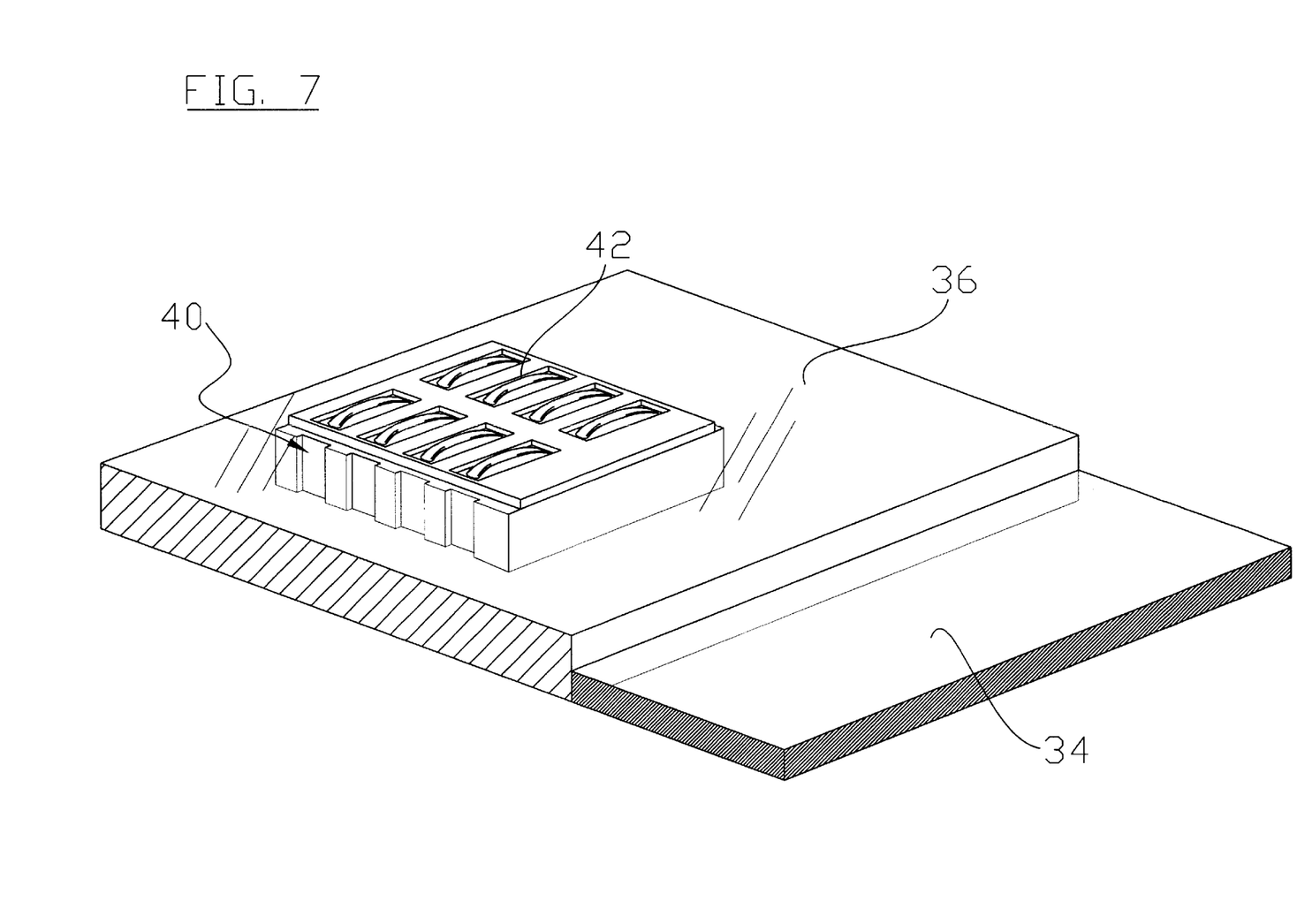
FIG. 7 is a magnified cutaway upper perspective view of the communication port.
Figure 8:
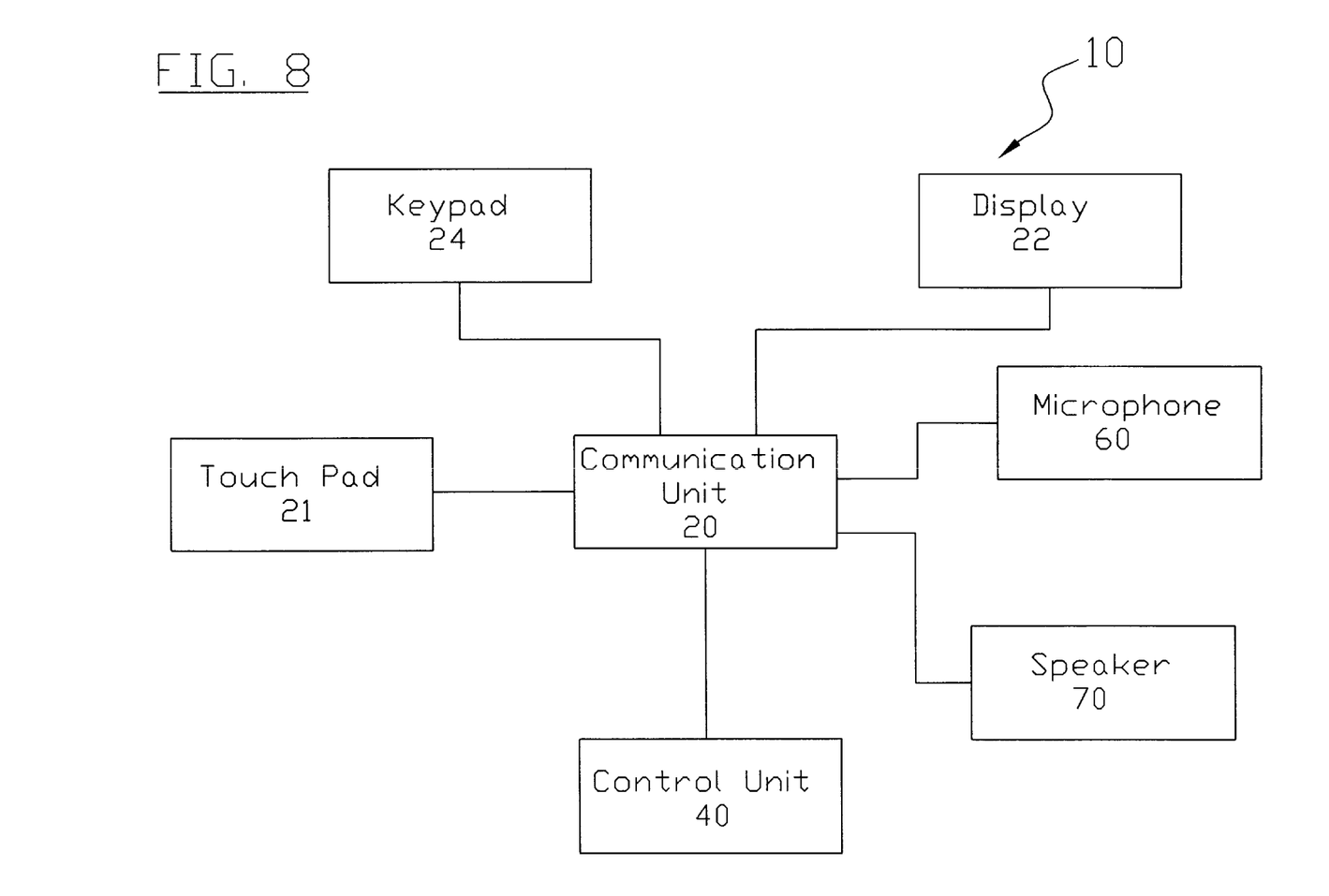
FIG. 8 is a block diagram of the present invention.
Figure 9:
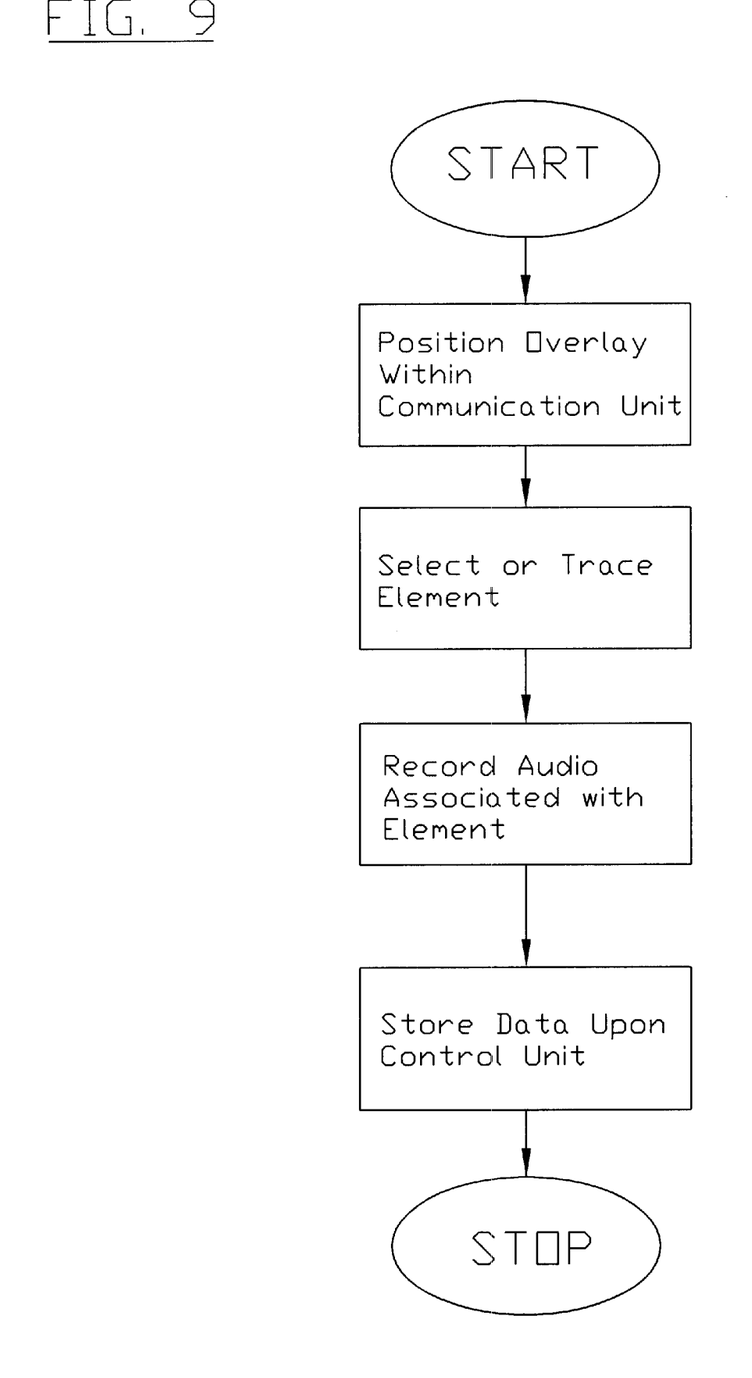
FIG. 9 is a flowchart illustrating the programming of the control unit positioned upon the communication unit.

As shown in FIGS. 1 and 6 of the drawings, the overlay 30 is a generally planar structure having a bar member 36 and a sheet 34 extending from the bar member 36. The sheet 34 may be preprinted with the elements 32, written or printed upon with conventional instruments/devices, or receive a printed piece of paper. The control unit 40 is attached to the bar member 36 as further shown in FIGS. 1 through 3 of the drawings. The bar member 36 is preferably rigid in structure while the sheet 34 is preferably flexible and resilient for allowing insertion into the cavity 26 of the communication unit 20. It can be appreciated that various other structures utilized to receive overlays 30 may be utilized within the communication unit 20 and overlay 30 for the present invention.

Figure 2:
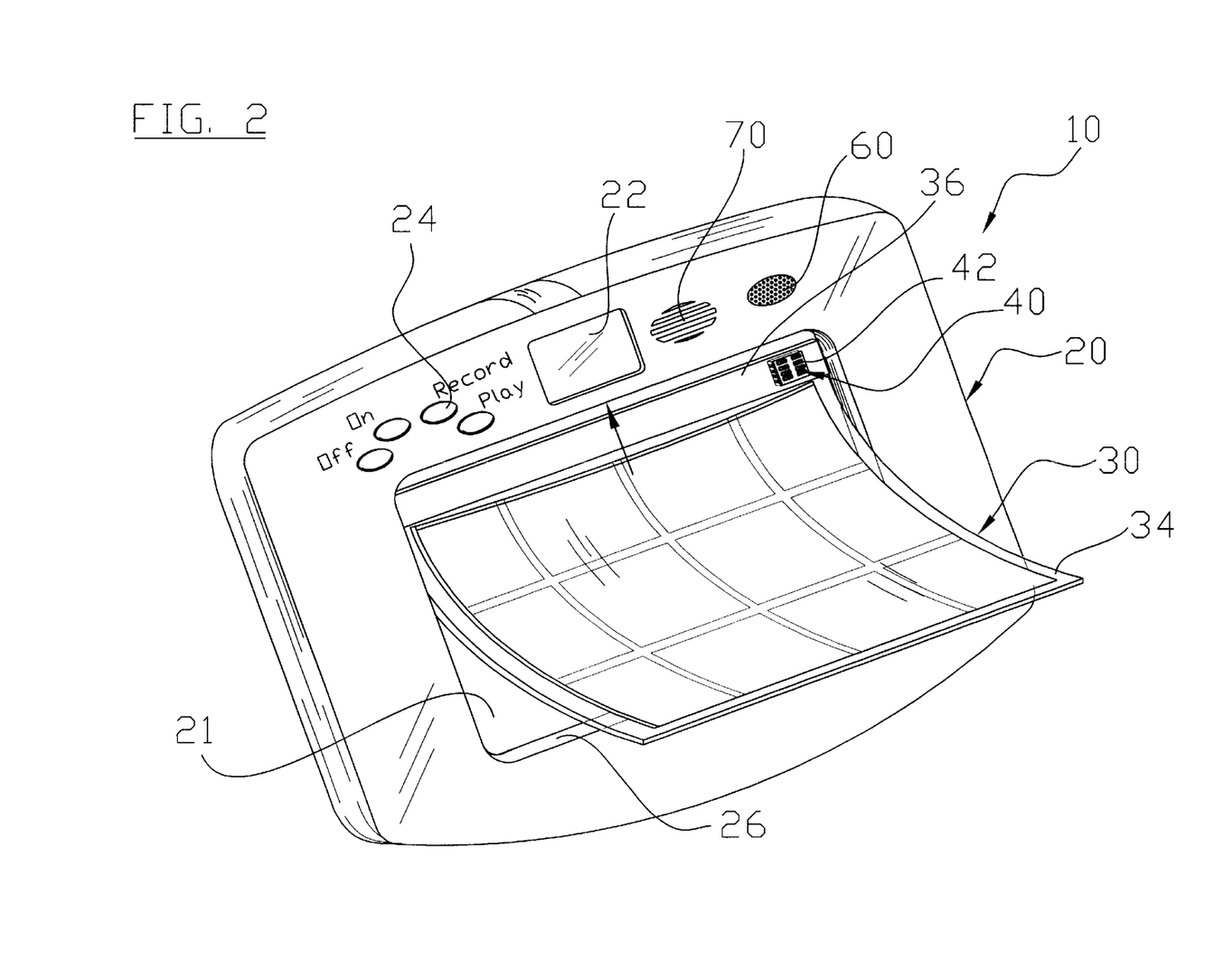
FIG. 2 is an upper perspective view of an overlay being positioned within the communication unit.
Figure 3:
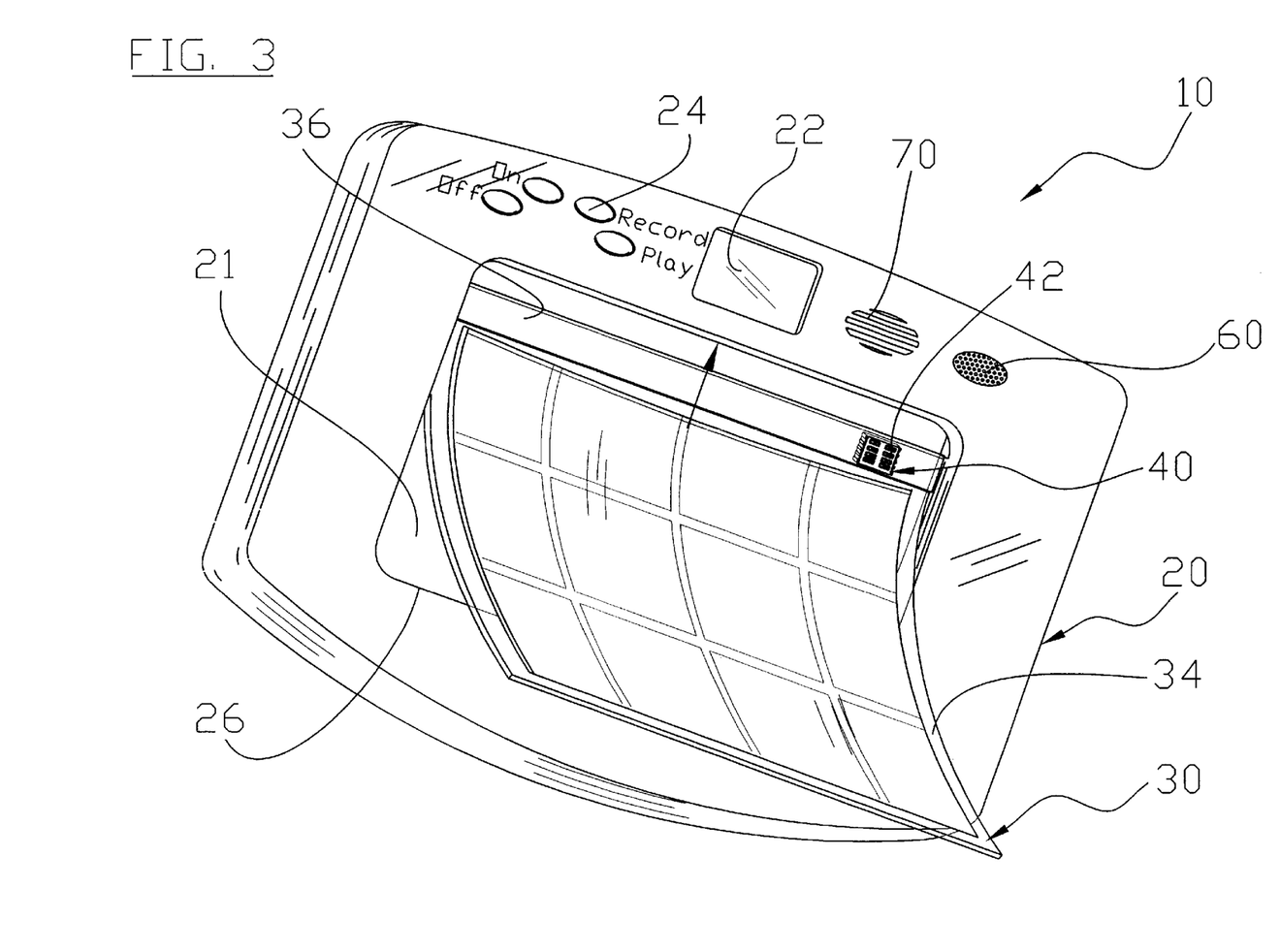
FIG. 3 is an upper perspective view of an overlay being positioned within the communication unit.
Figure 4:
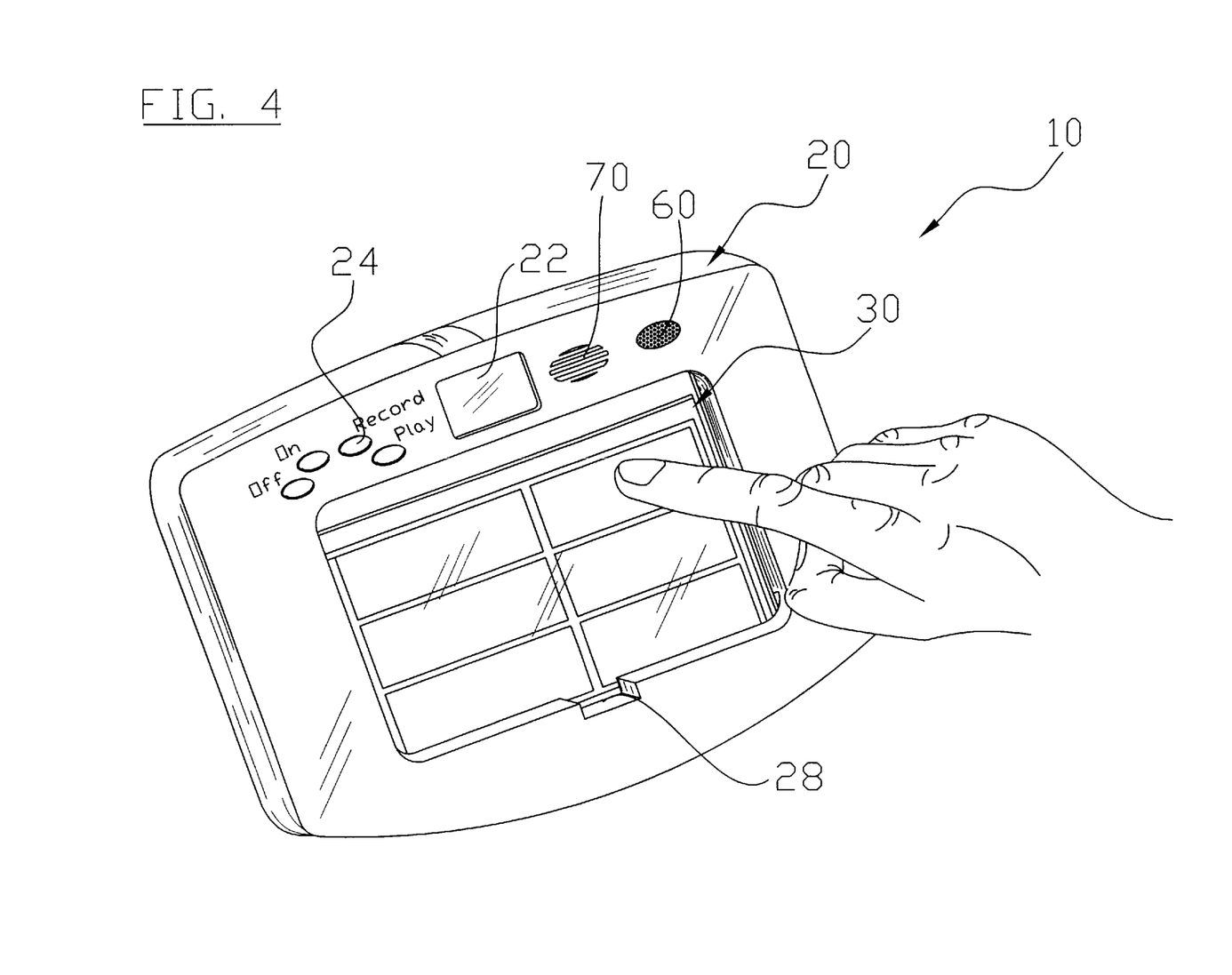
FIG. 4 is an upper perspective view of an overlay positioned within the communication unit.
Figure 5:
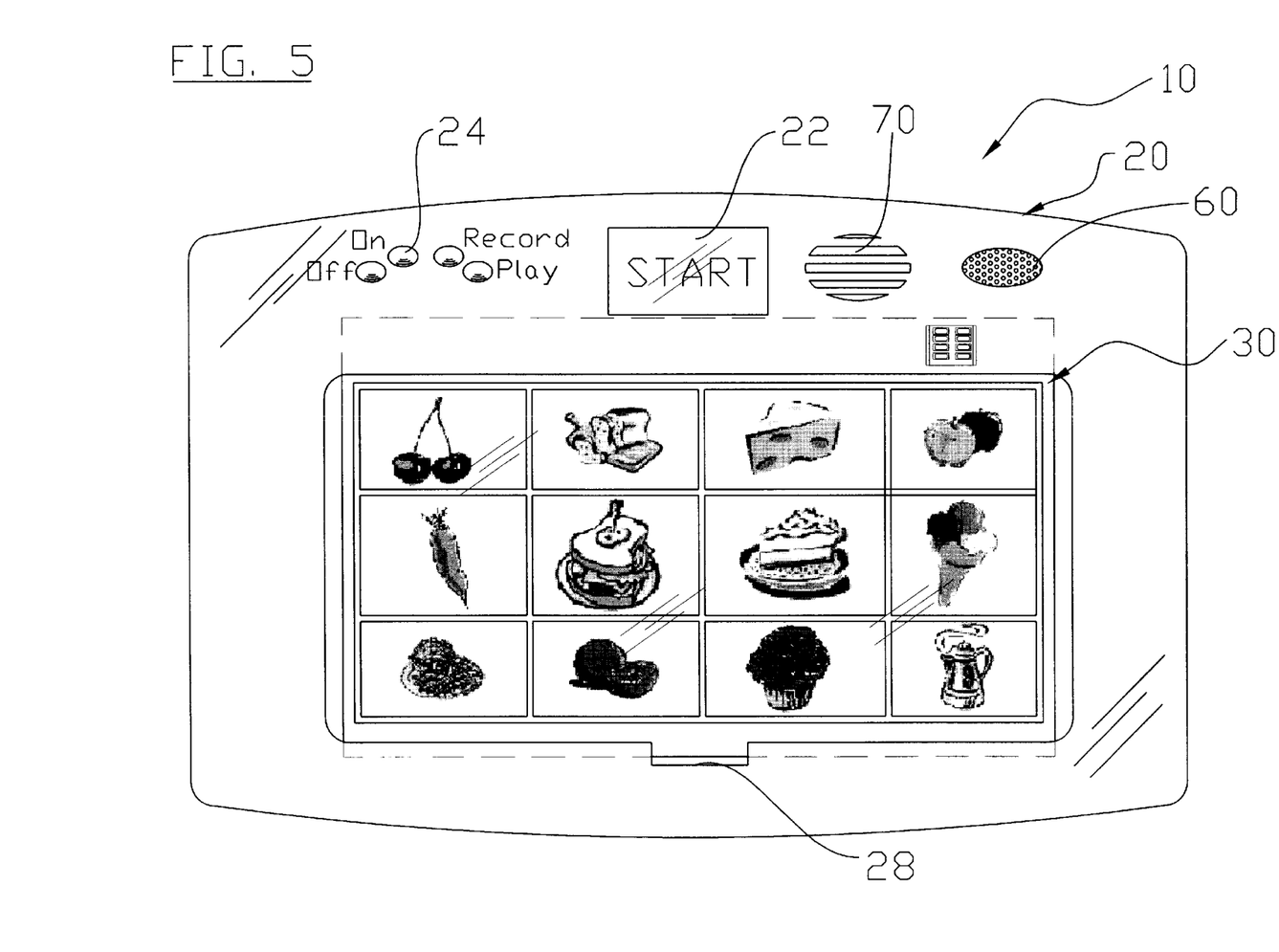
FIG. 5 is a top view of the overlay positioned within the communication unit.

The overlay 30 may have various shapes and sizes as can be appreciated. FIGS. 1 through 3 illustrate a rectangular overlay 30, however various other shapes may be utilized to construct the overlay 30. The elements 32 of the overlay 30 may be arranged in columns and rows as shown in FIGS. 5 and 6 of the drawings. It can be appreciated that the element 32 or elements 32 may be organized in various other structures and designs. The physical location and shape of each element 32 upon the overlay 30 is "structure data" that identifies each of the elements 32. In addition, the overlay may include elements 32 on the first side and the second side of the overlay that relate to different items thereby allowing the overlay 30 to be "flipped" to an opposing side to display new elements 32. The control unit 40 communicates to the communication unit 20 the relative position of the overlay 30 within the communication unit 20. The structure data for each overlay 30 is stored solely within the control unit 40 of the overlay 30. The elements 32 of the overlay 30 may consist of graphical designs and/or textual.

The control unit 40 is attached to the bar member 36 as shown in FIGS. 1 through 3 of the drawings. The control unit 40 contains the "structure data" and the "audio data" for the specific overlay 30 that the control unit 40 is attached to. The control unit 40 may be constructed of any integrated circuit (IC) design having memory. An interface 42 within the control unit 40 allows electronic communications to occur between the communication unit 20 when the overlay 30 is properly positioned within the communication unit 20. It can be appreciated that the communication unit 20 is capable of connecting with the interface 42 regardless of whether the first side or second side of the overlay 30 is face up.

The memory utilized within the control unit 40 may be comprised of any combination of random access memory (RAM), read only memory (ROM), programmable read-only memory (PROM), erasable programmable read-only memory (EPROM), and electrically erasable programmable read-only memory (EEPROM). The control unit 40 preferably utilizes EEPROM for storing structure data and audio data associated with the elements 32 of an overlay 30.

The control unit 40 may be programmed within the communication unit 20 to relate structure data to audio data. The structure data stored upon the control unit 40 may be permanent with respect to preset structures such as a grid-structure having a set number of columns and rows. However, the structure data stored upon the control unit 40 may also be programmable within the communication unit 20 to allow for the defining of elements 32 having uneven perimeters such as pictures, objects and graphical designs. Each individual element 32 may be programmed by the user "tracing" the perimeter of each element 32 with their finger or an object. After the element 32 has been identified, the corresponding audio may then be recorded upon the control unit 40 through the microphone 60.

Figure 10:
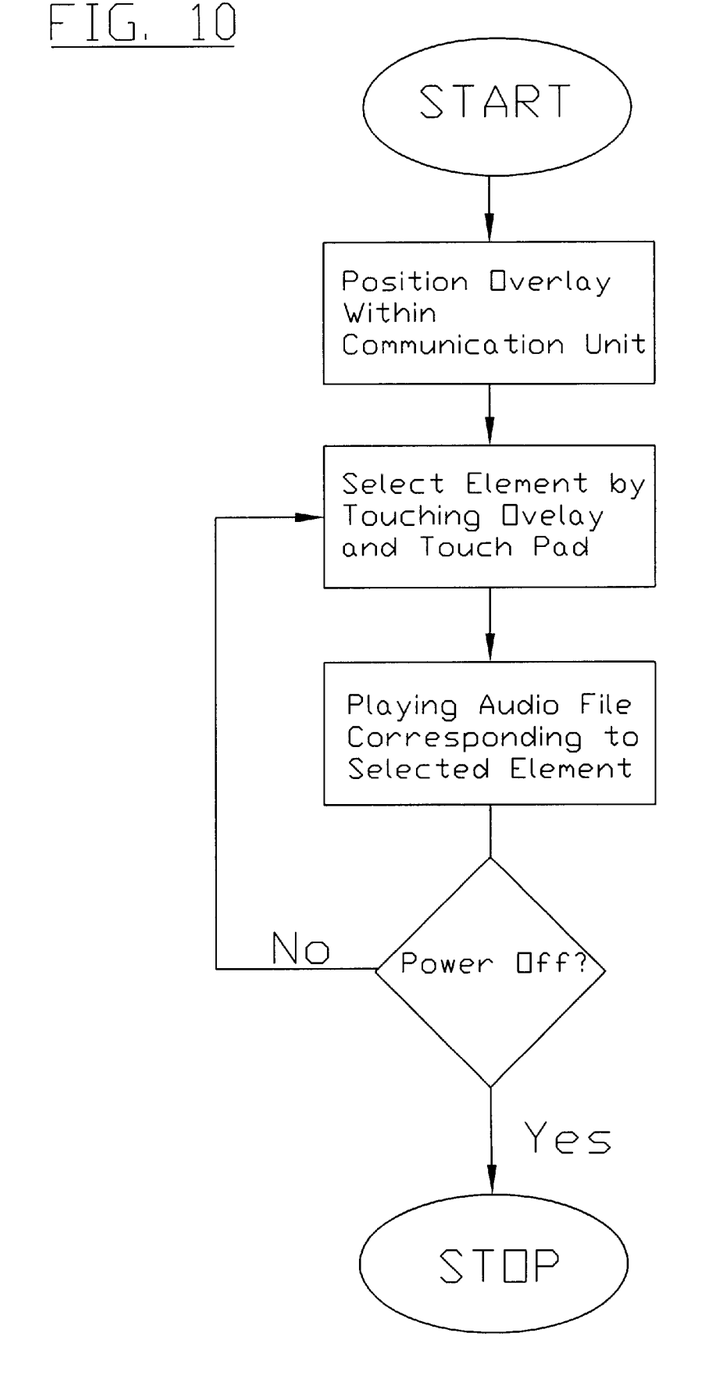
FIG. 10 is a flowchart illustrating the playing of audio data corresponding to selected items upon the overlay.

In use, the user positions the overlay 30 into the communication unit 20 as shown in FIGS. 1 through 5 of the drawings. The user then selects or traces an element 32 that is to have audio data recorded for. Once the element 32 is selected or traced, the user then records the audio that is to be associated with the selected/traced element 32. The structure data and the audio data corresponding to the element 32 is thereafter recorded upon the programmable memory within the control unit 40. This process continues until all elements 32 have had their respective structure data and audio data properly recorded as illustrated with FIG. 9 of the drawings. Once the overlay 30 has been properly programmed with the necessary structure data and audio data, when the user positions the overlay 30 into the communication unit 20 the interface 42 of the control unit 40 electrically mates with and communicates with the communication unit 20. When the user presses upon a specific item of the overlay 30, the touch pad 21 identifies the specific location upon the overlay 30 and accesses the audio data upon the control unit 40 that corresponds to the selected element 32 as defined by the structure data stored upon the control unit 40 as illustrated in FIG. 10 of the drawings. The audio data is then played via the speaker 70 for the user and others to hear thereby allowing the user to communicate with others. For example, if the elements 32 of the overlay 30 comprise a face having a head, ears, eyes, nose and a mouth, if the user selects the nose the phrase "nose" may be played via the speaker 70 along with any additional audio information. If the user removes the first overlay 30 and inserts a second overlay 30 having a different set of elements 32 positioned upon, the structure data and the audio data contained upon the second overlay 30 are preferably pre-programmed into the control unit 40 to allow the user to immediately begin usage of the second overlay 30. In addition, the first overlay 30 may be transferred to a second communication unit 20 and be usable without requiring programming of the second communication unit 20.

Figure 11:
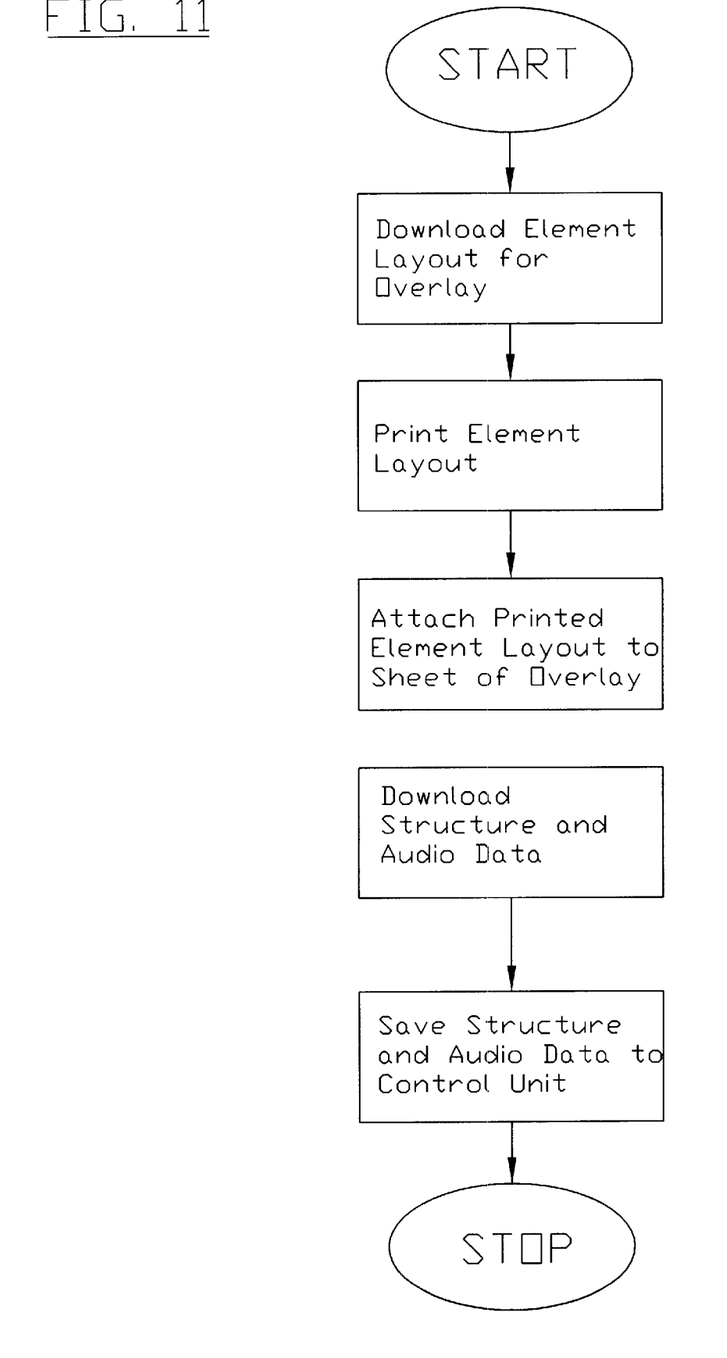
FIG. 11 is a flowchart illustrating the downloading of printable element information, corresponding structure data and corresponding audio data.

In addition to manually programming the control unit 40 and manually modifying the elements 32 upon the overlay 30, structure and audio data may be downloaded via a global computer network such as the Internet as illustrated in FIG. 11 of the drawings. This data may be directly recorded upon the control unit 40 as received. In addition, printouts and other graphical tools may be utilized to create the elements 32 for the overlay 30 and may be directly attached to the sheet 34 of the overlay 30. Various other methods may be utilized to program the present invention.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Index of Elements for Communication System With Interchangeable Overlays

☐ENVIRONMENTAL ELEMENTS
☐
☐
☐
☐
☐
☐
☐
☐
☐
☐10. Communication System With Interchangeable Overlays
☐11.
☐12.
☐13.
☐14.
☐15.
☐16.
☐17.
☐18.
☐19.
☐20. Communication Unit
☐21. TouchPad
☐22. Display
☐23.
☐24. Keypad
☐25.
☐26. Cavity
☐27.
☐28. Cutout
☐29.
☐30. Overlay
☐31.
☐32. Element
☐33.
☐34. Sheet
☐35.
☐36. Bar Member
☐37.
☐38.
☐39.
☐40. Control Unit
☐41.
☐42. Interface
☐43.
☐44.
☐45.
☐46.
☐47.
☐48.
☐49.
☐50.
☐51.
☐52.
☐53.
☐54.
☐55.
☐56.
☐57.
☐58.
☐59.
☐60. Microphone
☐61.
☐62.

-continued

Index of Elements for Communication System With Interchangeable Overlays

☐63.
☐64.
☐65.
☐66.
☐67.
☐68.
☐69.
☐70. Speaker
☐71.
☐72.
☐73.
☐74.
☐75.
☐76.
☐77.
☐78.
☐79.

I claim:

1. A communication system with interchangeable overlays, comprising:

a communication unit having a touch pad;

an overlay positionable within said communication unit over said touch pad, wherein said overlay includes at least one element; and a control unit attached to said overlay that is capable of communicating with said communication unit, wherein said control unit includes data associated with said at least one element.

2. The communication system with interchangeable overlays of claim 1, wherein said control unit has programmable memory for receiving and playing audio data corresponding to said at least one element.

3. The communication system with interchangeable overlays of claim 2, wherein said programmable memory is capable of receiving and providing structure data corresponding to said at least one element.

4. The communication system with interchangeable overlays of claim 3, wherein said programmable memory is comprised of electrically erasable programmable read-only memory (EEPROM).

5. The communication system with interchangeable overlays of claim 1, wherein said communication unit is capable of communicating with a global computer network for downloading element data, structure data and audio data.

6. The communication system with interchangeable overlays of claim 1, wherein said communication unit includes a cavity containing said touch pad and for receiving said overlay.

7. The communication system with interchangeable overlays of claim 6, wherein said overlay includes a bar member and a sheet, wherein said control unit is attached to said bar member.

8. The communication system with interchangeable overlays of claim 1, wherein said control unit includes a microphone and a speaker within.

9. A method of utilizing a communication system with interchangeable overlays, said method comprising the steps of:

(a) providing a communication unit and an overlay having a control unit with programmable memory;

(b) positioning said overlay within said communication unit with said control unit in communication with said communication unit;

(c) selecting an element upon said overlay; and (d) recording audio data upon said programmable memory of said control unit corresponding to said element.

10. The method of utilizing a communication system with interchangeable overlays of claim 9, wherein said step (c) comprises tracing said element.

11. The method of utilizing a communication system with interchangeable overlays of claim 10, wherein step (d) further includes recording structure data upon said programmable memory of said control unit corresponding to said tracing of said element.

12. The method of utilizing a communication system with interchangeable overlays of claim 9, including the following steps:

(e) pressing upon a selected element;

(f) determining said selected element; and (g) playing said audio data associated with said selected element.

13. A method of utilizing a communication system with interchangeable overlays, said method comprising the steps of:

(a) providing a communication unit and an overlay having a control unit with programmable memory;

(b) downloading image data, structure data and audio data associated;

(c) printing said image data and positioning said image data upon said overlay;

(d) positioning said overlay within said communication unit with said control unit in communication with said communication unit; and (e) recording said structure data and said audio data upon said programmable memory of said control unit.

14. The method of utilizing a communication system with interchangeable overlays of claim 13, including the following steps:

(f) pressing upon a selected element;

(g) determining said selected element; and (h) playing said audio data associated with said selected element.

* * * * *